United States Patent [19]

Kloefkorn

[11] Patent Number: 5,478,277
[45] Date of Patent: Dec. 26, 1995

[54] FORCE FEEDER CHAIN ASSEMBLY

[76] Inventor: Melvin L. Kloefkorn, P.O. Box 36, Manchester, Okla. 73758

[21] Appl. No.: 236,092

[22] Filed: May 2, 1994

[51] Int. Cl.$^6$ ..................................................... A01F 12/46
[52] U.S. Cl. ............................ 460/20; 460/114; 474/207
[58] Field of Search .................................. 460/16, 20, 70, 460/114; 474/207; 56/119, 219

[56] References Cited

U.S. PATENT DOCUMENTS

| | | | |
|---|---|---|---|
| 3,967,719 | 7/1976 | Kloefkorn et al. | 460/114 X |
| 5,346,429 | 9/1994 | Farley | 460/16 |

FOREIGN PATENT DOCUMENTS

| | | | |
|---|---|---|---|
| 1335520 | 4/1962 | France | 474/207 |

*Primary Examiner*—Terry Lee Melius
*Attorney, Agent, or Firm*—Phillip A. Rein

[57] ABSTRACT

An improved force feeder chain assembly including a force drive chain assembly on a conventional combine harvester apparatus and having a force feed slat assembly mounted thereon. The force feed slat assembly includes a plurality of elongated slat members for rotation on the force drive chain assembly for conventional harvesting operation. The force feed slat assembly includes a self-lubricating stripper insert member easily assembled and disassembled on respective elongated slat members for conversion of the force feed slat assembly from normal harvesting operations for use in a grain stripper harvesting operation. The force feed slat assembly with the stripper insert member thereon is easily and economically converted so as to be usable for all harvesting of crops, including the method of grain stripping utilized on a grain stripper combine harvester apparatus. The stripper insert members reduce friction and, thus, wear on the combine harvester apparatus and substantially lessens damage to the grain heads being harvested.

15 Claims, 2 Drawing Sheets

FORCE FEEDER CHAIN ASSEMBLY

PRIOR ART

A patent search was not conducted on this invention. The most pertinent art is the following United States patent issued to the applicant herein:

| U.S. Pat. No. | Invention | Inventor |
| --- | --- | --- |
| 3,967,719 | COMBINE CONVEYOR MEANS | Kloefkorn et al |

BACKGROUND OF THE INVENTION

The applicant has been in the business of providing after market improvements to farm combines used to harvest wheat and other grains. A farm combine harvest apparatus has been operable with a threshing reel assembly to cut crops, such as wheat, oats, barley, rye, corn, and other edible crops and having the same moved centrally by an auger assembly and then upwardly by a feeder chain assembly to a threshing cylinder in a material receiving housing.

The applicant's prior invention, as noted in U.S. Pat. No. 3,967,719 entitled "Combine Conveyor Means", issued Jul. 6, 1976, discloses a slat means 50 in FIG. 3 which is disclosed in this application in FIG. 2 as a force feed slat assembly 28. The force feed slat elongated assembly is used to force grain upwardly and into the threshing cylinder.

As the force feed slat assemblies clear the grain, the slat is going straight up and grain and straw cannot follow it and, thus, prevents back feeding and stopping the threshing cylinder from further operation.

At the present time, numerous farming operations have changed the use of the prior combine harvester apparatus into utilizing a grain stripper combine harvester apparatus which strips the grain material, such as wheat, barley, rice, grasses, peas, beans, and all edible crops, and the straw and stalk are left standing.

The grain stripper combine harvester apparatus uses rows of plastic combs or fingers on an eight bladed rotor similar to the prior art threshing assembly but operates not to cut the entire straw and grain attached thereto but to remove the grain therefrom. This grain is then conveyed into an auger assembly into a feeder chain assembly which, in turn, conveys the grain upwardly into a threshing cylinder.

In this new method of harvesting, it is found that the applicant's prior invention (U.S. Pat. No. 3,967,719) needs modification and improvement in order to properly move the harvested grain heads in the feeder chain assembly upwardly into the threshing cylinder in the grain stripper combine harvester apparatus.

Therefore, the invention herein may seem to be a slight improvement over the applicant's prior art patent but has proven to be extremely necessary in order to convey the stripped grain heads utilizing the grain stripper combine harvester apparatus.

PREFERRED EMBODIMENT OF THE INVENTION

In one preferred embodiment of this invention, an improved force feeder chain assembly is provided to be mounted on a combine harvester apparatus utilized to harvest numerous crops, such as wheat, with attached stalk and straw or using grain stripper headers to harvest only the grain heads.

The prior art combine harvester apparatus is provided with 1) a sickle assembly operable to contact and cut grain such as wheat with straw attached thereto; 2) an auger assembly operable to receive the threshed material for moving centrally; 3) a feeder chain assembly operable to receive the threshed material from the auger assembly for moving upwardly; and 4) a material receiving housing having a threshing cylinder to receive the material from the feeder chain assembly for threshing to remove the grain heads from the straw during a harvesting operation.

The new grain stripper combine harvester apparatus is as described above for the prior art combine harvester apparatus except the sickle assembly has been replaced by the eight bladed rotor to strip the grain heads by a header assembly, for example, from the straw.

The improved force feeder chain assembly includes a force drive chain assembly having connected thereto a force feed slat assembly of this invention. The force drive chain assembly is known in the prior art having a drive sprocket assembly with a drive chain assembly mounted thereon operable to drive and support respective outer ends of the force feed slat assembly. Each drive sprocket assembly includes a drive sprocket member and a pair of spaced driven sprocket members. The drive sprocket member is rotated by a known power source.

Each drive chain assembly includes a chain member mounted about respective drive and driven sprocket members to cause rotation in a conventional manner.

The force feed slat assembly includes a plurality of spaced, parallel elongated slat members, each having a stripper insert member connected thereto by a link and slat support assembly.

Each elongated slat member includes a main body section integral with a trailing flap section. The main body section is of generally U-shape in transverse cross section having a lead portion integral with a bottom support section which, in turn, is integral with a trailing support portion.

The trailing flap section extends rearwardly and perpendicular to the trailing support portion and provided with an outer end thrust portion engagable with material being conveyed upwardly and inwardly of the threshing cylinder of the combine harvester apparatus.

The elongated slat members are substantially identical to slat means 50, 70 described in the applicant's U.S. Pat. No. 3,967,719.

The stripper insert member is constructed of self-lubricating polymer formation plastic material. The self-lubricating feature is necessary to minimize the wear between the slat against a feeder housing bottom wall during movement upwardly into the threshing cylinder in the material receiving housing of the combine harvester apparatus. Further, the self-lubricating stripper insert member prevents crushing, splitting, and cracking of the harvested grain heads.

Each stripper insert member is provided with a main body section integral on opposite ends with outer connector end sections. The stripper insert member is preferably of square or rectangular shape in transverse cross section operable to be releasably mounted within the U-shaped main body section of the elongated slat member.

Each outer end connector section is provided with 1) a stepped anchor section: 2) a sprocket receiving hole; and 3) a slat anchor hole. The stepped anchor section is provided with a first hole portion integral with a larger second hole portion.

A link and slat support assembly is provided at each outer end of the elongated slat members in order to 1) releasably connect a stripper insert member to a respective slat member; and 2) connect the slat member to the chain member of the force drive chain assembly.

More particularly, each link and slat support assembly includes a link connector housing and a slat and insert connector assembly. The link connector housing includes cooperating, identical first and second support members interconnected by anchor members.

The first and second slat support members each include a side wall section integral with an anchor flange section. Each side wall section includes a pair of spaced connector holes to receive the anchor members therein.

Each anchor flange section is provided with a connector hole for attachment to either the stripper insert member or the elongated slat member.

The anchor members are pin bolt members having an outer hole therein so as to receive a connector clip in an assembled condition.

The slat and insert connector assembly includes an insert connector assembly and a slat connector assembly. The insert connector assembly comprises 1) a bolt member; 2) a sleeve member; 3) a washer member; and 4) a nut member being operable to connect the first slat support member and its anchor flange section to the stripper insert member and the elongated slat member.

The nut member, washer member, and sleeve member of the insert connector assembly are operable to be mounted within the stepped anchor section in the respective outer end connector sections of the stripper insert member as shown in FIG. 4.

The slat connector assembly includes a slat bolt member and a nut member operable to interconnect the outer anchor flange section of the second slat support member through the anchor holes to the respective outer ends of the elongated slat member. The nut members of the slat connector assembly are operable to be housed within the slat anchor holes in the stripper insert member.

OBJECTS OF THE INVENTION

One object of this invention is to convert prior art force feeder chain assemblies on a combine harvester apparatus to an all-purpose improved force feeder chain assembly to harvest numerous types of crops.

Another object of this invention is to provide an improved force feeder chain assembly operable with a prior art force feeder chain assembly by attaching a self-lubricating stripper insert member thereon with a minimum amount of skill, time, and effort required.

One other object of this invention is to convert a prior art force feeder chain assembly into an improved force feeder chain assembly operable to move stripped grain heads received from grain stripper headers on grain stripper combine harvester apparatuses presently being utilized as a means of harvesting crops.

A further object of this invention is to provide an improved force feeder chain assembly including spaced, parallel elongated slat members each having a self-lubricating stripper insert member mounted thereon so as to provide a self-lubricating characteristic that prevents 1) wear on a feeder housing bottom wall; and 2) crushing, cracking, and splitting of grain heads of edible crops being harvested by a grain stripper combine harvester apparatus.

One further object of this invention is to provide an improved force feeder chain assembly having a self-lubricating stripper insert members mounted on respective elongated slat members which are easily attached and removed for converting the combine harvester apparatus from normally harvesting wheat, including the stalk and straw, to use as a grain stripper combine harvester apparatus which then strips and conveys only the grain heads with the stripper insert members preventing 1) unnecessary wear on the slats and a feeder housing bottom wall; and 2) splitting, cracking, and crushing of grain heads, such as barley, rice, wheat, grasses, peas, beans, and all similar edible crops.

Still, one other object of this invention is to provide an improved force feeder chain assembly utilizing a plurality of parallel spaced elongated slat members having a self-lubricating stripper insert member mounted thereon which are easy to install and remove from a force drive chain assembly for converting to different types of harvesting operations; easy to manufacture; being of a self-lubricating plastic construction; and substantially maintenance free.

Various other objects, advantages, and features of the invention will become apparent to those skilled in the art from the following discussion, taken in conjunction with the accompanying drawings, in which:

FIGURES OF THE INVENTION

Figure 1:
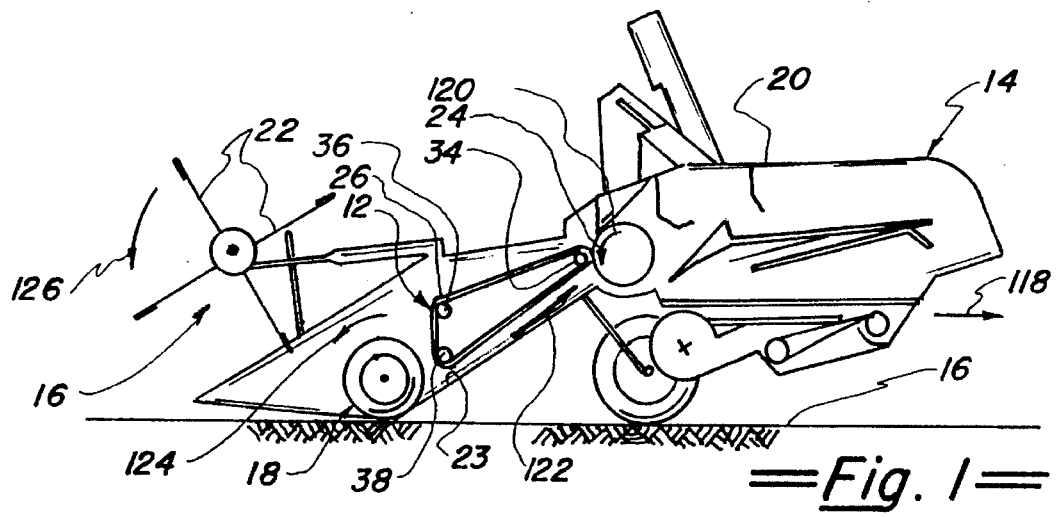
FIG. 1 is a schematic diagram of a side elevational view of a combine harvester apparatus having the improved force feeder chain assembly of this invention mounted thereon.

The following is a discussion and description of preferred specific embodiments of the improved force feeder chain assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, an improved force feeder chain assembly of this invention, indicated generally at 12, is illustrated as mounted on a combine harvester apparatus 14 utilized to harvest by a grain stripper method whereupon only the grain heads are harvested.

The combine harvester apparatus 14 is provided with a header assembly 16 operable through special harvester combs or fingers to remove only the grain heads which are fed into an auger assembly 18 which, in turn, moves the grain heads upwardly into the improved force feeder chain assembly 12 which operates to convey same upwardly into a threshing cylinder 24.

The header assembly 16 is provided with a plurality of rotor members 22 being revolved to utilize the combs or fingers to move the harvested grain heads into the auger assembly 18.

The improved force feeder chain assembly 12 operates to contact the grain heads and move the same upwardly while supported on a feeder housing bottom wall 23.

The improved force feeder chain assembly 12 includes a pair of spaced force drive chain assemblies 26 having mounted therebetween a force feed slat assembly 28 being the improvement over the applicant's prior art U.S. Pat. No. 3,967,719 entitled "Combine Conveyor Means".

The force drive chain assembly 26 is known in the prior art and is includes a drive sprocket assembly 30 interconnected by a drive chain assembly 32.

The drive sprocket assembly 30 includes a drive sprocket member 34 and spaced driven sprocket members 36, 38.

The sprocket members 34, 36, 38 are repeated on an opposite side of the force feed slat assembly 28 for identical driving and support as will become obvious.

The drive sprocket member 34 is provided with 1) tooth drive sections 40; 2) a central drive support shaft 42; and 3) bearing members (not shown) to rotatably support the drive support shaft 42.

Each driven sprocket member 36, 38 is provided with the tooth drive sections 40 and drive support shaft 42 with the support shafts being supported on the bearing members as described for the drive sprocket member 34. Operation and rotation of the force drive chain assembly 26 is well known and detailed description thereof is not deemed necessary.

Figure 2:
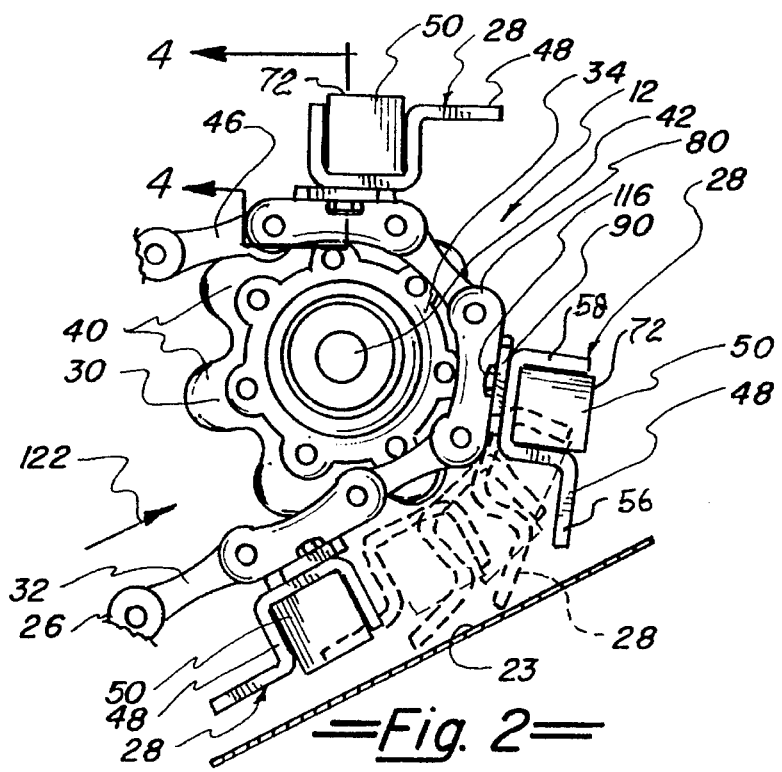
FIG. 2 is an enlarged fragmentary side elevational view of a portion of a force feed slat assembly connected to a force drive chain assembly.

The drive chain assembly 32 includes a chain member 46 mounted about respective sets of the sprocket members 34, 36 for movement as noted by an arrow 122 in FIGS. 1 and 2.

As best shown in FIG. 2, the force feed slat assembly 28 includes an elongated slat member 48 having a stripper insert member 50 releasably connected thereto by a link and slat support assembly 52. A plurality of the force feed slat assemblies 28 are placed in spaced, parallel relationship on the force drive chain assembly 26 to provide continuous movement of severed grain heads to move the same into the threshing cylinder 24 of the combine harvester apparatus 14.

Figure 3:
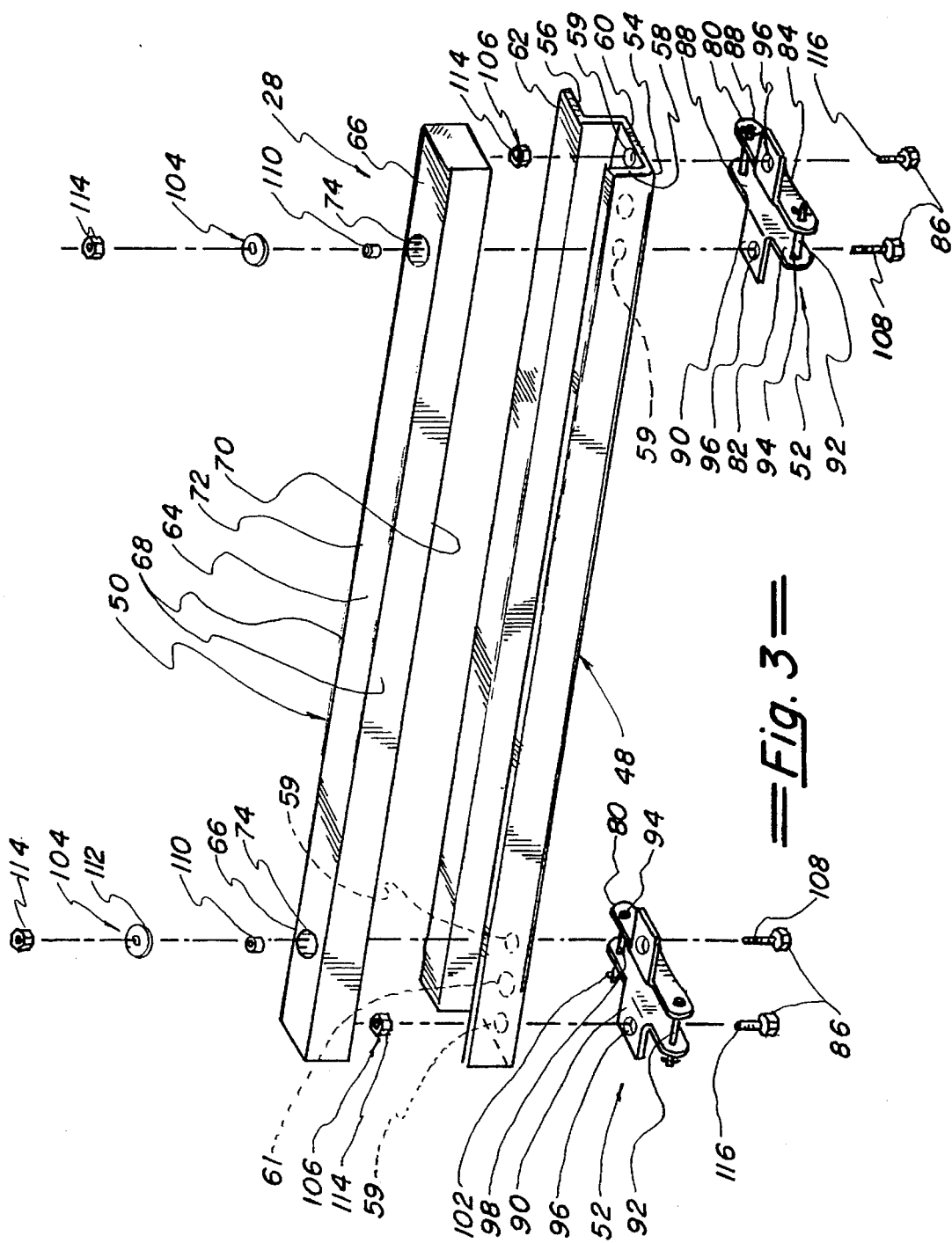
FIG. 3 is an exploded perspective view of the improved force feeder chain assembly of this invention.

As shown in FIG. 3, each elongated slat member 48 is provided with a main body section 54 of U-shape in transverse cross integral with a trailing flap section 56. The main body section 54 is provided with a lead portion 58 integral with a bottom support portion 60 which, in turn, is integral with a trailing support portion 63.

The portions 58, 60, 63 cooperate to form the generally U-shape in transverse cross section operable to receive and releasably support a respective stripper insert member 50 therein as will be noted.

The bottom support portion 60 on each outer end of the slat member 48 is provided with a pair of spaced bolt holes 59 and, centrally therebetween, is a sprocket receiving or clearance hole 61.

The trailing flap section 56 is provided with an outer end thrust portion 62 which is operable to thrust the grain heads being conveyed upwardly into the threshing cylinder 24 as noted in dotted lines in FIG. 2. This action of propelling the grain heads into the threshing cylinder 24 in a material receiving housing 20 is fully described in the applicant's U.S. Pat. No. 3,967,719.

Each stripper insert member 50 is constructed of a self-lubricating plastic material, such as WHMW homopolymer polypropylene such as manufactured by POLY-41 of Fort Wayne, Indiana under their registered trademark "TIVAR". This "TIVAR" plastic material won't break in cold weather; won't rust or corrode; is lightweight and non-stick; is highly abrasion resistant; and being self-lubricating.

This self-lubricating feature is important as, with a grain stripper combine harvester apparatus, this prevents excessive wear on the elongated slat members 48 and the feeder housing bottom wall 23 of the combine harvester apparatus 14.

Each stripper insert member 50, preferably of square or rectangular shape in transverse cross section, includes a main body section 64 integral with respective outer end connector sections 66. The main body section 64 is provided with spaced parallel side wall portions 68 integral with an inner wall portion 70 and an outer contact wall portion 72.

As noted in FIG. 2, the outer contact wall portion 72 is extended outwardly of the outer surfaces of the lead portion 58 and the trailing flap section 56.

Figure 4:
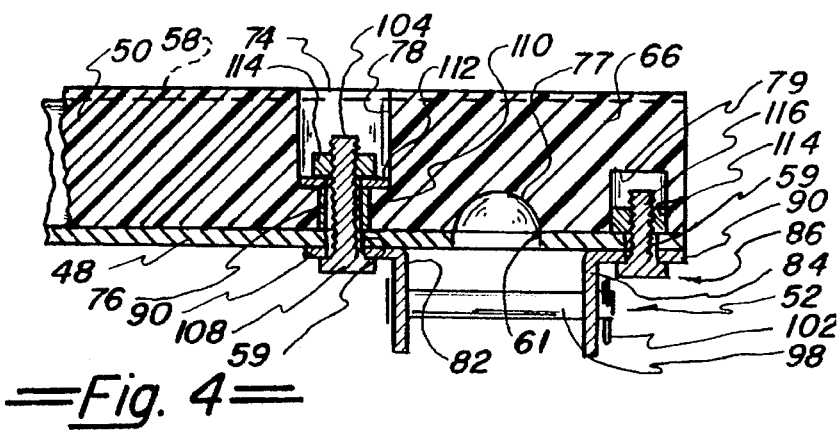
FIG. 4 is an enlarged fragmentary sectional view taken along line 4—4 in FIG. 2 illustrating only the improved force feeder chain assembly.

Each outer end connector section 66 is provided with a stepped anchor section 74, a sprocket receiving or clearance hole 77, and a slat anchor hole 79 as noted in FIG. 4. The stepped anchor section 74 is provided with a first hole portion 76 integral with a larger second hole portion 78 for receiving portions of the link and slat support assembly 62 therein.

As noted in FIG. 3, the link and slat support assembly 52 includes a link connector housing 80 and a slat and insert connector assembly 86 for connection to the respective stripper insert members 50 and elongated slat members 48. Each lead connector housing 80 includes first and second support members 82, 84 which are identical in appearance and utilized in pairs thereof.

Each first and second support member 82, 84 include a side wall section 88 integral with a anchor flange section 90 which is to be interconnected by anchor members 92. Each side wall section 88 is provided with spaced connector holes 94 to receive the anchor members 92 therethrough.

Each anchor flange section 90 is provided with an anchor hole 96 to receive a portion of the slat and insert connector assembly 86 therethrough as will be noted.

The anchor members 92 comprise a bolt or pin member 98 having a hole in one end to receive a connector clip 102 therethrough in the assembled condition.

The slat and insert connector assembly 86 includes an insert connector assembly 104 and a slat connector assembly 106. Each insert connector assembly 104 comprises a bolt member 108, a sleeve member 110, a washer member 112, and a nut member 114 to be assembled as noted in FIG. 4.

The slat connector assembly 106 includes a slat bolt member 116 and a nut member 114 being in the assembled condition as noted in FIG. 4.

The insert connector assemblies 104 operate to interconnect the elongated slat member 48 and the stripper insert member 50 to the inner first support members 82.

The slat connector assemblies 106 operate to interconnect the outer or second support members 84 to the elongated slat member 48. This means of connection is important as it makes the respective stripper insert members 50, through disassembly of the insert connector assembly 104, easily removable when it is desired to return to conventional harvesting operations (row crops such as corn, sunflowers, and milo with stalk and straw attached) with the combine apparatus 14.

USE AND OPERATION OF THE INVENTION

In the use and operation of the the improved force feeder chain assembly 12, the use of the force drive chain assembly 26 having elongated slat members 48 mounted thereon in spaced, parallel relationship be rotated as noted by the arrow 122 in FIGS. 1 and 2 is well known in the prior art.

During conventional operation of the combine harvester apparatus 14 without the use of the stripper insert members 50, it is obvious that the same is utilized for harvesting with a conventional sickle assembly whereupon you have the crop with the head, stalk, and straw, such as with wheat, between the elongated slat members 48 and the feeder housing bottom wall 23 during the normal crop harvesting operation. The grain and straw are good lubricants and will not cause excessive wear on the feeder housing bottom wall 23.

On harvesting various crops with modern techniques, using a grain stripper combine harvester having a plurality of grain stripper headers, this operates to strip the grain heads only and leave the straw or other similar residue standing in the fields being harvested. In this case, the harvester operator would then change the force feed slat assembly 28 by adding the stripper insert member 50 into respective ones of the elongated slat members 48 as noted in FIG. 2.

The respective elongated slat members 48 have been previously anchored to outer ones of the second support members 84 through use of the slat connector assembly 106. This is a permanent connection and would normally not be removed.

The stripper insert member 50 is then connected to the respective elongated slat members 48 through use of the insert connector assembly 104. More particularly, it is noted that the bolt member 108 is inserted through the bolt holes 59 in the respective elongated slat member 48 and the stripper insert member 50 is mounted thereon.

The sleeve member 110 is then inserted within the first hole portion 76 and the washer member 112 is mounted thereon. The respective nut member 114 is then threaded on the bolt member 108 to achieve the assembled condition in FIG. 4.

An insert connector assembly 104 is mounted on each opposite end of the outer connector end sections 66 of the stripper insert member 50.

As noted in FIG. 2, the outer contact wall portion 72 of the stripper insert member 50 is extended outwardly of an outer surface of the lead portion 58 and the trailing flap section 56. the stripper insert member 50, being of a self-lubricating material, thereupon takes the pressure of the grain heads being conveyed to the threshing cylinder 24 of the combine harvester apparatus 14 instead of causing contact and excessive wear of the slat members 48 against feeder housing bottom wall 23. The self-lubrication of the stripper insert member 50 further prevents crushing, splitting, and cracking of the grain heads which increases the income received therefrom.

It is noted that the sprocket receiving hole 61 in the elongated slat members 48 and the sprocket receiving hole 77 in the outer end connector sections 66 of the stripper insert member 50 are operable to receive and permit movement of the tooth drive section 40 of respective ones of the drive sprocket member 34 and driven sprocket members 36, 38 to be moved therein without interference on rotation of the chain member 46. Without subject sprocket receiving holes 61, 67 there would tend to be a build-up of grain heads therein to hinder proper rotational operation of the entire improved force feeder chain assembly 12.

It is noted that the improved force feeder chain assembly 12 of this invention is readily mountable in the combine harvester apparatus 14 for normal use during a harvesting operation for prior art harvesting methods.

The self-lubricating stripper insert members 50 can be readily connected to the respective elongated slat members 48 to provide a self-lubricating stripper insert member 50 for use in a new grain stripper method of harvesting utilizing a grain stripper combine harvester apparatus which harvests the grain heads only for use in harvesting barley, rice, wheat, grasses, peas, beans, and similar edible crops.

The improved force feeder chain assembly of this invention provides an easy means for assembly and disassembly of the stripper insert members on respective elongated slat members which is economical to manufacture; requiring little labor and skill involved in assembly and disassembly of the stripper insert member; and substantially maintenance free.

While the invention has been described in conjunction with preferred specific embodiments thereof, it will be understood that this description is intended to illustrate and not to limit the scope of the invention, which is defined by the following claims:

I claim:

1. An improved force feeder chain assembly to be utilized on a combine harvester apparatus in order to move stripped grain material from grain stripper headers upwardly on a feeder housing bottom wall into a threshing cylinder in a material receiving housing, comprising:

a) a drive chain assembly operable to be driven about a drive sprocket assembly to move the stripped grain material upwardly on the feeder housing bottom wall;

b) a force feed slat assembly connected to said drive chain assembly including a plurality of parallel spaced slat members each having a main body section, each having a stripper insert member connected to and within said main body section; and c) each of said stripper insert members having an outer contact wall portion extended laterally of said main body section to achieve upward movement of the stripped grain material into the threshing cylinder.

2. An improved force feeder chain assembly as described in claim 1, wherein:

a) said stripper insert member constructed of a self-lubricating material.

3. An improved force feeder chain assembly as described in claim 1, wherein:

a) each slat member having said main body section integral with a trailing flap section;

b) said main body section having a lead portion with an integral bottom wall support portion which is integral with said trailing flap section; and c) said stripper insert member mounted within and partially enclosed by said main body section and having said outer contact wall portion extended laterally of said lead portion and said trailing flap section.

4. An improved force feeder chain assembly as described in claim 1, wherein:

a) said stripper insert member connected to said elongated slat member by an insert connector assembly; and b) said insert connector assembly is operable to releasably connect said stripper insert member to said slat member;

whereby said improved force feeder chain assembly can be utilized with said slat member connected to said drive chain assembly for use with multiple crops with said stripper insert member removed therefrom and said stripper insert member can be releasably connected to said slat member for use in harvesting stripped grain material.

5. A force feed slat assembly connected to a force feeder chain assembly on a combine harvester apparatus, comprising:

a) a slat member having a main body section connected to a trailing flap section; and b) a stripper insert member connected to and enclosed by said main body section and extended laterally therefrom;

whereby said trailing flap section and said stripper insert member cooperate to move severed grain particles from an auger assembly upwardly into a threshing cylinder on the combine harvester apparatus.

6. A force feed slat assembly as described in claim 5, wherein:

a) said main body section of generally U-shape in transverse cross section operable to have said stripper insert member releasably connected thereto: and b) said stripper insert member having an outer contact wall portion which is extended outwardly and laterally of said slat member.

7. A force feed slat assembly as described in claim 5, wherein:

a) said stripper insert member is connected by a link and slat support assembly to said slat member;

b) said said link and slat support assembly includes a slat and insert connector assembly having an insert connector assembly and a slat connector assembly;

c) said slat connector assembly connects said slat member to said force feeder chain assembly; and d) said insert connector assembly releasably connects said stripper insert member to said slat member so that it may be removed depending on a type of operation of the combine harvester apparatus, whether utilized in a threshing operation or utilized in a grain stripper operation of the combine harvester apparatus.

8. A force feed slat assembly as described in claim 5, wherein:

a) a plurality of spaced, parallel ones of said slat member are utilized on the force feeder chain assembly; and b) said stripper insert member is constructed of a self-lubricating plastic material to reduce friction and resultant wear encountered therefrom.

9. An improved force feeder chain assembly utilized on a combine harvester apparatus which initially severs a grain material through grain stripper headers and moves the severed grain material upwardly upon an inclined feeder housing bottom wall utilizing said force feeder chain assembly to do so, and discharges the grain material into a threshing cylinder in a material receiving housing, the improvement herein relating to said force feeder chain assembly, comprising:

a) spaced first and second driven sprocket members connected to drive sprocket members by a drive chain assembly;

b) a force feed slat assembly connected to said drive chain assembly;

c) said force feed slat assembly includes a slat member having a main body section and an insert member connected to and enclosed by said main body section; and d) said insert member contacts the grain material with a self-lubricating surface to reduce friction and resultant wear on the feeder housing bottom wall and damage to the grain material;

whereby said force feeder chain assembly is operable to move the grain material upwardly into the material receiving housing.

10. An improved force feeder chain assembly as described in claim 9, wherein:

a) said insert member is releasably connected to said slat member and extends outwardly and laterally therefrom to engage the grain material.

11. An improved force feeder chain assembly as described in claim 9, wherein:

a) said force feed slat assembly includes a plurality of parallel spaced said slat members, each having a respective one of said insert member connected thereto; and b) said insert member constructed of a self-lubricating material.

12. An improved force feeder chain assembly as described in claim 9, wherein:

a) said slat member having a main body section integral with a trailing flap section;

b) said main body section of generally U-shape in transverse cross section having said insert member releasably connected to and enclosed by said main body section; and c) said trailing flap section and an outer contact wall portion of said insert member extended in spaced parallel planes cooperating to contact the grain material pressed against the feeder housing bottom wall.

13. An improved force feeder chain assembly as described in claim 9, wherein:

a) said force feeder assembly includes a slat and insert connector assembly;

b) said slat and insert connector assembly includes an insert connector assembly and a slat connector assembly;

c) said slat connector assembly is operable to connect said slat member to said drive chain assembly; and d) said insert connector assembly releasably connects said insert member to said slat member.

14. An improved force feeder chain assembly as described in claim 9, wherein:

a) said slat member and said inset member each having a sprocket receiving hole to allow said first and second drive sprocket members and said drive sprocket member to pass therein to prevent clogging of said drive chain assembly on movement of the grain material thereby.

15. An improved force feeder chain assembly as described in claim 5, wherein:

a) said stripper insert member constructed of a self-lubricating material.

* * * * *